United States Patent
Horiba et al.

(10) Patent No.: US 9,853,514 B2
(45) Date of Patent: Dec. 26, 2017

(54) INTERPHASE INSULATING SHEETS WITH VOIDS AT ANNULAR PORTIONS FOR ROTATING ELECTRIC MACHINE, ROTATING ELECTRIC MACHINE, AND ELECTRIC COMPRESSOR FOR VEHICLE

(71) Applicant: KABUSHIKI KAISHA TOYOTA JIDOSHOKKI, Kariya-shi, Aichi-ken (JP)

(72) Inventors: Tatsuya Horiba, Aichi-ken (JP); Hiroshi Fukasaku, Aichi-ken (JP); Minoru Mera, Aichi-ken (JP); Taizo Hirano, Aichi-ken (JP); Shinichi Okuyama, Aichi-ken (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 242 days.

(21) Appl. No.: 14/600,357

(22) Filed: Jan. 20, 2015

(65) Prior Publication Data
US 2015/0207375 A1    Jul. 23, 2015

(30) Foreign Application Priority Data

Jan. 21, 2014    (JP) .................................. 2014-008519

(51) Int. Cl.
*H02K 3/00* (2006.01)
*H02K 3/34* (2006.01)
(Continued)

(52) U.S. Cl.
CPC ............... *H02K 3/345* (2013.01); *H02K 1/16* (2013.01); *H02K 3/38* (2013.01); *H02K 3/30* (2013.01); *H02K 3/32* (2013.01); *H02K 3/34* (2013.01)

(58) Field of Classification Search
CPC .. H02K 3/30; H02K 3/32; H02K 3/34; H02K 3/345; H02K 3/38; H02K 3/487; H02K 3/48; H02K 1/16
(Continued)

(56) References Cited

U.S. PATENT DOCUMENTS 5,093,543 A * 3/1992 Patton ..................... H02K 3/38
                                                    174/138 E
7,560,850 B2    7/2009 Uetsuji et al.
(Continued)

FOREIGN PATENT DOCUMENTS

CN    201142604 Y    10/2008
JP    58-041034 U     9/1981
(Continued)

OTHER PUBLICATIONS

JP58-041034 English Translation.*
(Continued)

*Primary Examiner* — Michael Andrews
*Assistant Examiner* — Maged Almawri
(74) *Attorney, Agent, or Firm* — Sughrue Mion, PLLC

(57) ABSTRACT

Annular portions of a first interphase insulting sheet have void portions. After a U-phase coil is inserted in wave winding, bridge portions are mounted to slots for an adjacent V-phase coil. The void portions are formed at positions corresponding to the bridge portions that are disposed between any two of coil ends. The annular portions are stretched to form a generally pentagon shape, which facilitates mounting of the V-phase coil. The void portions formed at positions that do not need insulation will not impair the insulating function of the first interphase insulating sheet. The void portions formed in alignment with extension of the bridge portions will not cause a drop in the strength of the annular portions.

7 Claims, 7 Drawing Sheets

(51) Int. Cl.
*H02K 1/16* (2006.01)
*H02K 3/38* (2006.01)
H02K 3/30 (2006.01)
H02K 3/32 (2006.01)

(58) Field of Classification Search
USPC .................................................. 310/215, 214
See application file for complete search history.

(56) References Cited

U.S. PATENT DOCUMENTS

| | | | | |
|---|---|---|---|---|
| 7,649,296 B2* | 1/2010 | Fukasaku | ................ | H02K 3/34 174/138 E |
| 8,456,054 B2 | 6/2013 | Mera et al. | | |
| 2008/0317614 A1* | 12/2008 | Horiba | ................ | F04C 29/0085 417/410.3 |
| 2009/0079291 A1* | 3/2009 | Horiba | ................ | H02K 3/34 310/215 |
| 2009/0079292 A1* | 3/2009 | Horiba | ................ | H02K 3/34 310/215 |
| 2009/0108696 A1* | 4/2009 | Horiba | ................ | H02K 3/38 310/215 |
| 2011/0012475 A1* | 1/2011 | Mera | ................ | H02K 3/345 310/215 |
| 2011/0148244 A1* | 6/2011 | Bliemeister | ............ | H02K 9/005 310/215 |

FOREIGN PATENT DOCUMENTS

| | | | |
|---|---|---|---|
| JP | 57-111047 U1 | | 9/1982 |
| JP | 58-025541 U1 | | 2/1983 |
| JP | 58-41034 | * | 3/1983 |
| JP | 58-041034 | * | 3/1983 |
| JP | 62-168760 U | | 10/1987 |
| JP | 2003-333785 A | | 11/2003 |
| JP | 2006-149003 A | | 6/2006 |
| JP | 2009-77582 A | | 4/2009 |
| JP | 2011-024310 A | | 2/2011 |

OTHER PUBLICATIONS ip.com NPL and Patent Search IQQueryQuickExport-201708311319 date: Aug. 31, 2017.*
Communication dated Oct. 28, 2016, from the State Intellectual Property Office of People's Republic of China in counterpart Application No. 201510027858.1.

* cited by examiner

INTERPHASE INSULATING SHEETS WITH VOIDS AT ANNULAR PORTIONS FOR ROTATING ELECTRIC MACHINE, ROTATING ELECTRIC MACHINE, AND ELECTRIC COMPRESSOR FOR VEHICLE

BACKGROUND OF THE INVENTION

The present invention relates to an interphase insulating sheet for a rotating electric machine, a rotating electric machine, and an electric compressor for a vehicle.

The wave winding, which is a type of the distributed winding, is known as a method for winding a coil on a stator core of a rotating electric machine. For example, in a three-phase alternating (AC) current rotating electric machine, coils of three phases, that is, a U-phase coil, a V-phase coil, and a W-phase coil, are inserted in a plurality of slots formed in a stator core of the rotating electric machine by wave winding. Each of the coils has coil ends that extend out from the opposite axial ends of the stator core (i.e. the end of the lead wire side and the end on the side opposite to the lead wire side). For insulation of the coils from each other, an interphase insulating sheet is interposed between the coil ends of any two different phases.

A typical interphase insulating sheet has a pair of annular portions, one extending out from the lead wire side of the stator core and the other annular portion extending out from the side opposite to the lead wire side, and a plurality of bridge portions that connects the paired annular portions to each other to thereby form the interphase insulating sheet of a cylindrical shape. The interphase insulating sheet is mounted to the stator core by inserting the U-phase coil in each of the slots for the U-phase and then inserting the bridge portions in each of the slots for the V-phase. The interphase insulating sheet that is formed in a cylindrical shape is resilient to deformation, and coil ends of the U-phase coil extend out from the stator core. Therefore, due to its elasticity, the shape of the interphase insulating sheet may be disordered and the interphase insulating sheet may extend inwardly from the slots toward the center of the stator core, thus hindering the mounting of the V-phase coil or the W-phase coil to the stator core. Such disordering in shape of the interphase insulating sheet may occur more frequently with an increase of the number of the polarities of the rotating electric machine.

For example, Japanese Unexamined Utility Model Application Publication No. 62-168760 discloses an interphase insulating sheet for insulating coil ends of different phases. The interphase insulating sheet includes two strip-shaped insulating portions each having a linear slit. The slits formed in the interphase insulating sheet may be enlarged and the parts of the interphase insulating sheet across the slits may be moved so as to overlap with each other, forming wrinkles in the sheet. This makes it possible for the interphase insulating sheet to be put into close contact with the curved surface of the coil ends.

The interphase insulating sheet for insulating coil ends of different phases disclosed in the above publication has the silts at positions that correspond to the positions of the coil ends of the U-phase coil which is first mounted to the stator core. Although the above enlargement of the slits or the overlapping in the interphase insulating sheet enables close contact between the interphase insulating sheet and the coil end of the U-phase coil, a clearance or no-insulating portion may be created, and which may result in an impaired insulating function between the coil ends of the U-phase coil and the coil ends of the V-phase coil.

Mounting the V-phase coil to the stator core applies a large load in tensioning direction or compressing direction to the interphase insulating sheet. There is a fear that application of such load decreases the strength of the strip-shaped insulating portions at the slits and the insulating portions are torn at the slits. Such damaged insulating sheet may cause further impairment of the insulating function of the interphase insulating sheet.

The present invention is directed to providing an interphase insulating sheet for a rotating electric machine that prevents the shape of the interphase insulating sheet from being disordered without impairing the insulating function and the strength of the interphase insulating sheet.

SUMMARY OF THE INVENTION

In accordance with an aspect of the present invention, there is provided an interphase insulating sheet for a rotating electric machine that includes an annular stator core, a first phase coil and a second phase coil different in phase from the first phase coil. The stator core includes a plurality of slots in which the two phase coils are inserted by wave winding. Each of the first phase coil and the second phase coil has a plurality of first coil ends extending out from a first axial end of the stator core and a plurality of second coil ends extending out from a second axial end of the stator core. The interphase insulating sheet includes a first annular portion for providing insulation between the first coil ends of the first phase coil and the second phase coil, a second annular portion for providing insulation between the second coil ends of the first phase coil and the second phase coil, and a plurality of bridge portions connecting the first annular portion to the second annular portion. The bridge portions are configured to be mounted to the slots. At least one of the first annular portion and the second annular portion has a plurality of void portions extending from an inner peripheral surface to an outer peripheral surface of the annular portion. The void portions are arranged equidistantly in a circumferential direction. The void portions are arranged at positions corresponding to the bridge portions.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the embodiments together with the accompanying drawings in which:

DETAILED DESCRIPTION OF THE PREFERRED EMBODIMENTS

First Embodiment

The first embodiment of the present invention will now be described with reference to FIGS. 1 to 5. An electric compressor 1 for a vehicle according to the first embodiment forms a part of a refrigeration circuit in a vehicle air conditioner. The present invention is embodied in a rotating electric machine such as 3 that drives a scroll type compression mechanism 2 of the electric compressor 1. It is to be noted that in FIG. 1, the left side corresponds to the front side of the electric compressor 1 and the right side corresponds to the rear side of the electric compressor 1.

Figure 1:
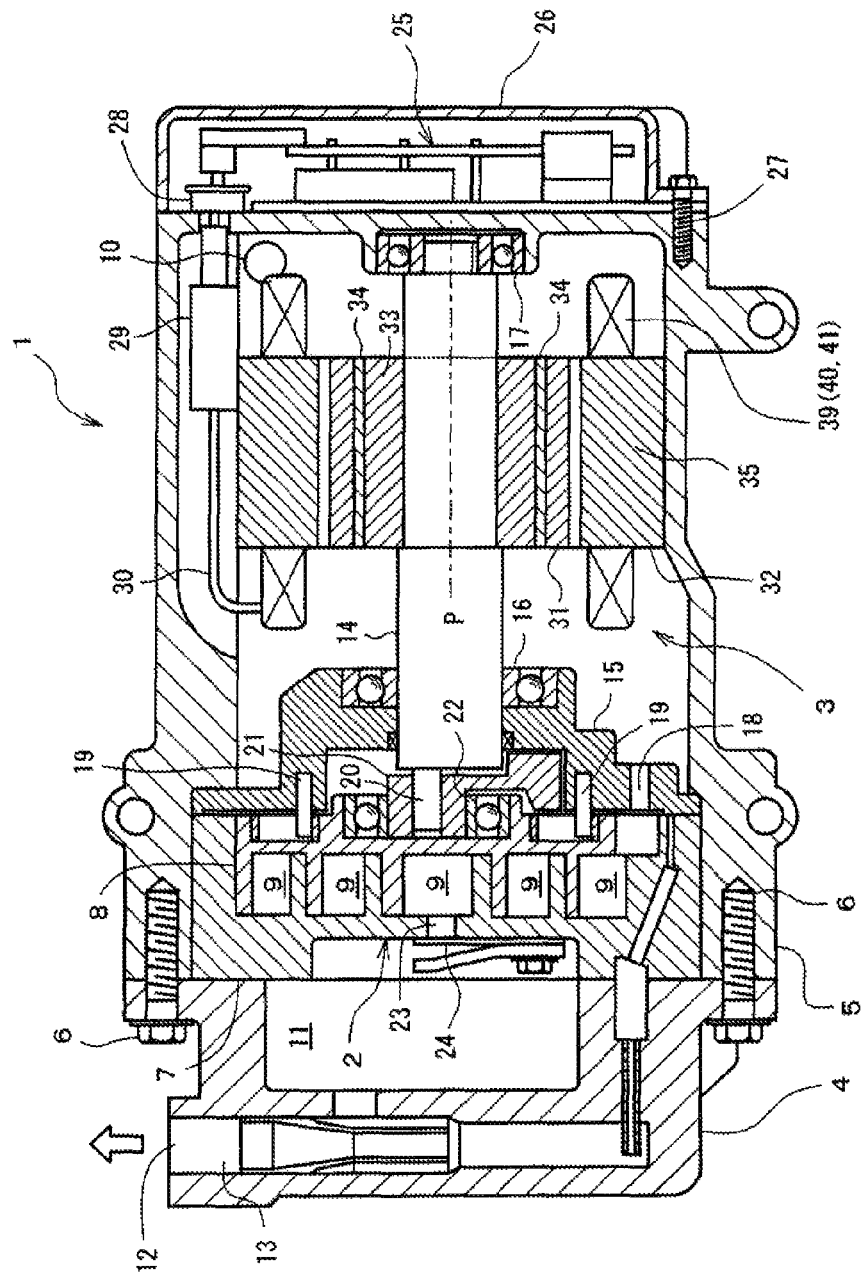
FIG. 1 is a longitudinal sectional view of an electric compressor for a vehicle according to a first embodiment of the present invention.

Referring to FIG. 1, the electric compressor 1 includes a discharge housing 4 and a motor housing 5, which are joined together with a plurality of bolts 6. The scroll type compression mechanism 2 is disposed in the front of the motor housing 5 and the rotating electric machine 3 is disposed in the rear of the motor housing 5. The scroll type compression mechanism 2 includes a fixed scroll member 7 that is fixed to the motor housing 5 and a movable scroll member 8 that faces the fixed scroll member 7. The fixed scroll member 7 and the movable scroll member 8 cooperate to form a compression chamber 9 therebetween.

An inlet port 10 is formed through the motor housing 5 at an upper part thereof, providing fluid communication between the interior of the motor housing 5 and an external refrigeration circuit (not shown). When the scroll type compression mechanism 2 is in operation, refrigerant gas of low pressure is drawn into the motor housing 5 through the inlet port 10. The discharge housing 4 has therein a discharge chamber 11 that is communicable with the compression chamber 9 and also has at an upper part thereof an outlet port 12 that provides fluid communication between the discharge chamber 11 and the external refrigeration circuit (not shown). The discharge chamber 11 is in communication with the outlet port 12 through a communication passage 13 and high-pressure refrigerant gas in the discharge chamber 11 is delivered to the external refrigeration circuit through the communication passage 13 and the outlet port 12.

The movable scroll member 8 of the scroll type compression mechanism 2 is connected to a rotary shaft 14 of the rotating electric machine 3 and is driven by the operation of the rotating electric machine 3. One end of the rotary shaft 14 that is located adjacent to the movable scroll member 8 is supported by a bearing 16 in a shaft support member 15 that is fixed to the motor housing 5 and the other end of the rotary shaft 14 is supported by a bearing 17 provided in a rear wall of the motor housing 5. The shaft support member 15 has therethrough a suction port 18 through which the interior of the motor housing 5 is communicable with the compression chamber 9. Refrigerant gas that is taken into the motor housing 5 through the inlet port 10 is flowed through the rotating electric machine 3 and introduced into the compression chamber 9 through the suction port 18. A plurality of anti-rotation pins 19 is fixed to the front wall of the shaft support member 15. The pins 19 project into bores formed in the rear wall of the movable scroll member 8 to thereby prevent the movable scroll member 8 from rotating on its own axis.

The rotary shaft 14 has at the front end thereof an eccentric pin 20 that projects toward the movable scroll member 8. The eccentric pin 20 is provided eccentrically to the center axis P of the rotary shaft 14. Therefore, the eccentric pin 20 revolves around the center axis P with the rotation of the rotary shaft 14. The eccentric pin 20 is rotatably fitted in a hole formed in a drive bushing 21 that is disposed between the rotary shaft 14 and the movable scroll member 8. The movable scroll member 8 is mounted on the drive bushing 21 through a bearing 22. Therefore, when the rotary shaft 14 is rotated, the movable scroll member 8 is caused to make an orbital movement through the eccentric pin 20 and the drive bushing 21. During such orbital movement, the movable scroll member 8 is prevented by the pins 19 from rotating on its axis.

The orbiting movement of the movable scroll member 8 reduces the volume of the compression chamber 9 and the refrigerant gas introduced into the compression chamber 9 through the suction port 18 is compressed accordingly. The compressed refrigerant gas that is passed through a discharge port 23 formed through the fixed scroll member 7 at the center thereof opens a discharge valve 24 and is discharged therethrough into the discharge chamber 11.

The motor housing 5 has at the rear end thereof a drive circuit casing 26 that is fixed by bolts 27 (only one bolt being shown in the drawing) and houses therein a drive circuit 25. The drive circuit 25 includes an inverter that supplies three-phase AC current to the rotating electric machine 3 and a hermetic terminal 28 that is electrically connected to the drive circuit 25. Furthermore, in the motor housing 5, a cluster block 29 is provided on the outer periphery of the rotating electric machine 3 and electrically connected to the drive circuit 25. The rotating electric machine 3 has lead wires 30 that are electrically connected to the cluster block 29. Therefore, supplying power to the lead wires 30 through the hermetic terminal 28 drives the rotating electric machine 3, which in turn drives the rotary shaft 14 and hence causes the scroll type compression mechanism 2 to operate for compression of refrigerant gas.

The rotating electric machine 3 includes a rotor 31 that includes a three-phase AC motor and is fixed on the rotary shaft 14 and a stator 32 that is disposed radially outward of the rotor 31 and fixed to the inner wall of the motor housing 5. The rotor 31 has a rotor core 33 in which a permanent magnet 34 is embedded. The stator 32 has the stator core 35 to which a U-phase coil 36 as the first phase coil, a V-phase coil 37 as the second phase coil, and a W-phase coil 38 as the third phase coil of the present invention are mounted (see FIG. 2).

Referring to FIG. 1, coil ends 39 of the U-phase coil 36, coil ends 40 of the V-phase coil 37, and coil ends 41 of the W-phase coil 38 extend out from the opposite ends of the stator core 35 in the axial direction (the lead wire side and the side opposite to the lead wire side, i.e., the left side and the right side, respectively in FIG. 1). The lead wires 30 are drawn out from the respective coil ends 39, 40 and 41 on the lead wire side of the stator core 35 and connected to the cluster block 29.

Detailed configuration of the stator 32 will now be described with reference to FIG. 2. The rotating electric machine 3 is a three-phase AC motor including the rotor 31 having ten poles. The stator core 35 is formed in an annular shape and has a plurality of slots 42 that are opened toward the rotor 31. Specifically, the stator core 35 has thirty slots 42. The U-phase coil 36, the V-phase coil 37 and the W-phase coil 38 are inserted in the slots 42 by wave winding and mounted to the stator core 35.

Figure 2:
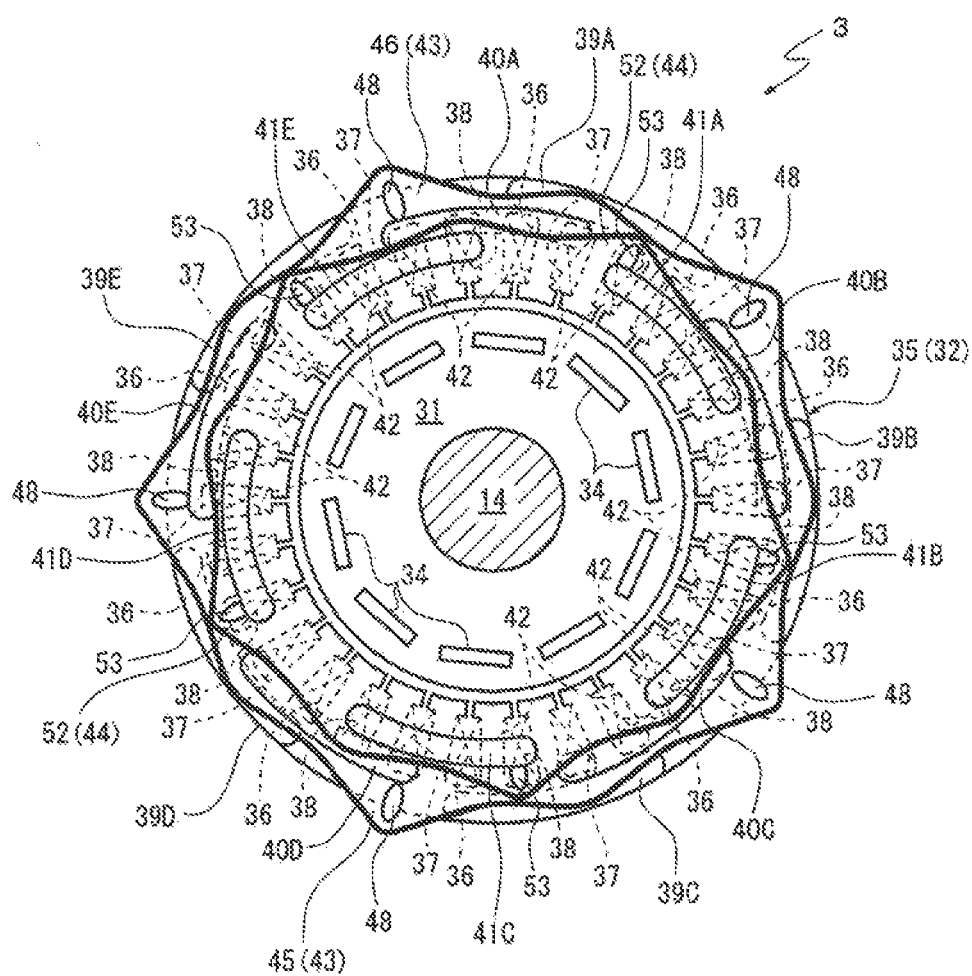
FIG. 2 is a schematic front view of a rotating electric machine that is installed in the electric compressor of FIG. 1.

The coil ends 39 of the U-phase coil 36 on the lead wire side thereof has five projections of an arc shape along the outermost circumference of the stator core 35 (for the sake of the ease of explanation, the projections are designated by 39A, 39B, 39C, 39D, and 39E, respectively, in FIG. 2). The coil ends 40 of the V-phase coil 37 on the same lead wire side thereof has five projections 40A, 40B, 40C, 40D, and 40E along a circumference of the stator core 35 that is radially inward of the coil ends 39 of the U-phase coil 36. Similarly, the coil ends 41 of the W-phase coil 38 has five projections 41A, 41B, 41C, 41D, and 41E along a circumference of the stator core 35 that is radially inward of the coil ends 40 of the V-phase coil 37 (i.e. the innermost circumference of the three phases). Although not shown in the drawing, the coil ends 39, 40, and 41 of the U-phase, the V-phase, and the W-phase, respectively, also project on the side opposite to the lead wire side and each coil end has five projections that are shifted angularly in phase by an angle corresponding to three slots 42 with respect to the counterpart coil ends on the lead wire side.

A first interphase insulating sheet 43 that is made of a synthetic resin is interposed between the coil ends 39 of the U-phase coil 36 and the coil ends 40 of the V-phase coil 37 in the entire circumferential direction of the stator core 35 to thereby insulate the coil ends 39 and the coil ends 40 from each other on the lead wire side of the stator core 35. A second interphase insulating sheet 44 that is also made of a synthetic resin is interposed between the coil ends 40 of the V-phase coil 37 and the coil ends 41 of the W-phase coil 38 in the entire circumferential direction of the stator core 35 to thereby insulate the coil ends 40 and the coil ends 41 from each other on the lead wire side of the stator core 35. Although not shown in the drawing, the first and second interphase insulating sheets 43, 44 are interposed in the same manner in the entire circumferential direction on the side opposite to the lead wire side so as to insulate the coil ends 39 of the U-phase coil 36, the coil ends 40 of the V-phase coil 37 and the coil ends 41 of the W-phase coil 38 from each other.

Figure 3:
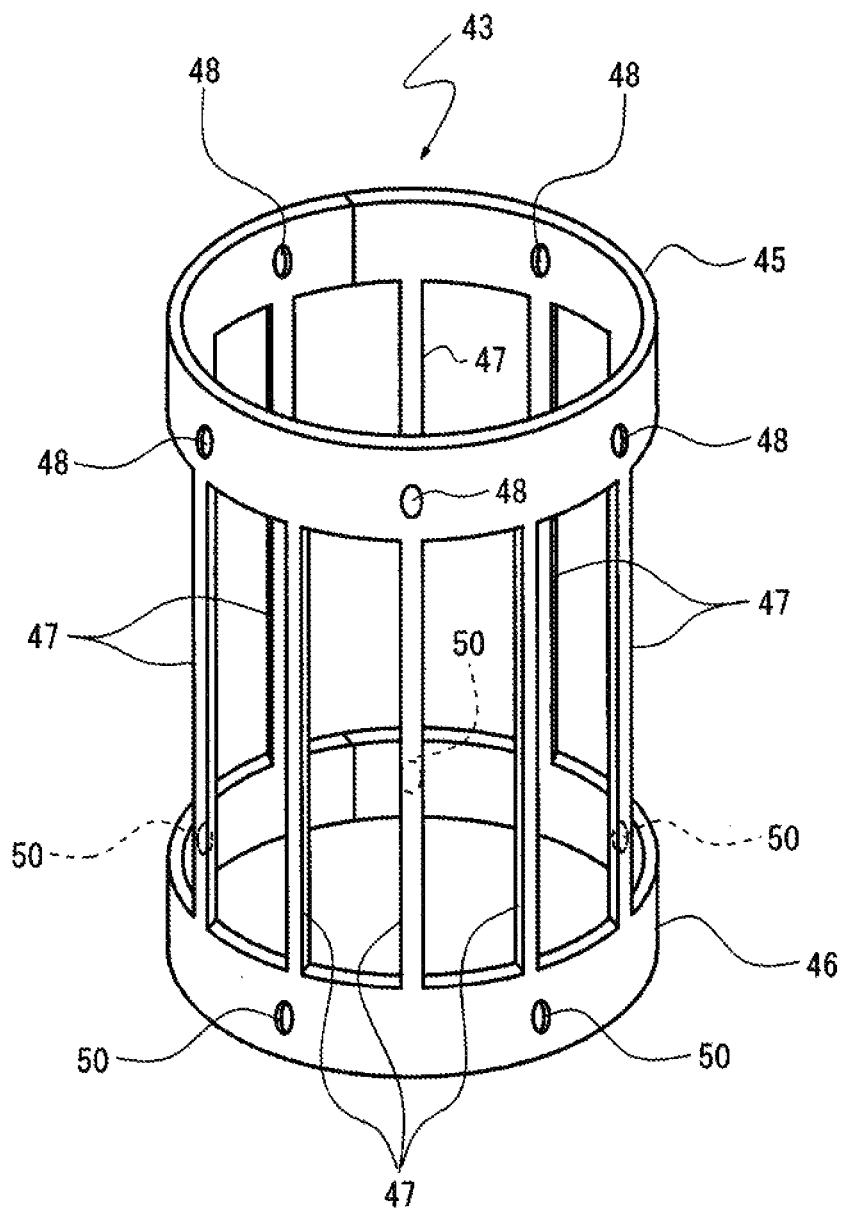
FIG. 3 is a perspective view of a first interphase insulating sheet according to the first embodiment.
Figure 4:
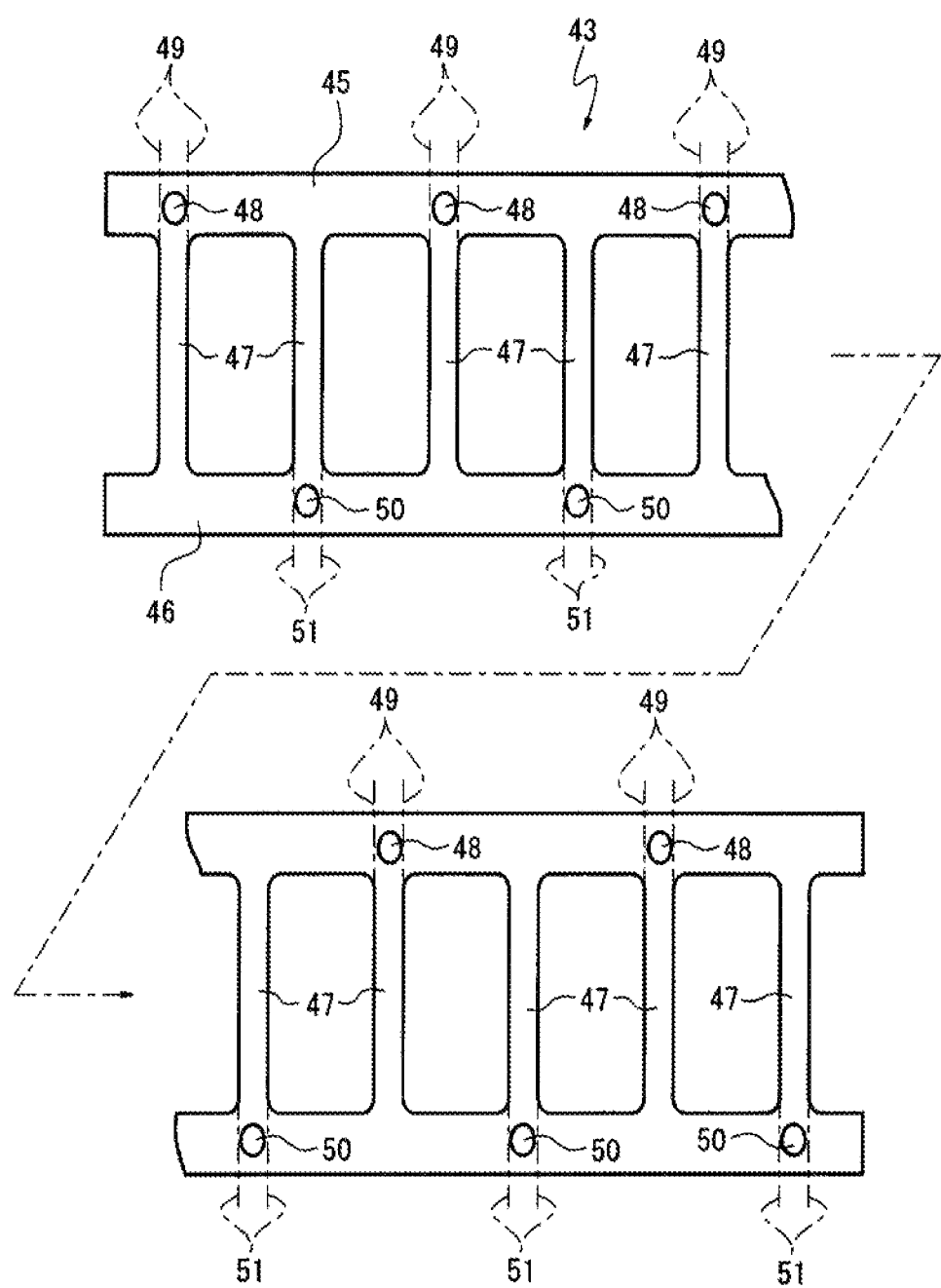
FIG. 4 shows the first interphase insulating sheet of FIG. 3 in a flattened state.

Detailed configuration of the first interphase insulating sheet 43 will now be described with reference to FIGS. 3 and 4. As shown in FIG. 3, the first interphase insulating sheet 43 includes a pair of annular portions 45, 46 and a plurality of bridge portions 47, or ten pieces of bridge portions in the illustrated embodiment, connecting the annular portions 45 and 46 to each other to thereby form generally a cylindrical shape. Each bridge portion 47 has such a length that the annular portions 45, 46 extend out from the opposite ends of the stator core 35 when the first interphase insulating sheet 43 is mounted to the stator core 35.

The annular portion 45 has an inner peripheral surface, an outer peripheral surface, and five void portions 48 in the form of round hole, particularly, of an elliptical shape that are formed through and along the annular portion 45. The void portions 48 extend from the inner peripheral surface to the outer peripheral surface. The void portions 48 are arranged equidistantly in the circumferential direction of the annular portion 45 at portions corresponding to the bridge portions of the annular portion 45. Referring to FIG. 4 showing the first interphase insulating sheet 45 in a flattened state, the void portions 48 are arranged in the annular portion 45 at intervals of one bridge portion 47. Specifically, each void portion 48 is formed substantially at the center of the annular portion 45 in the width direction thereof and also in alignment with extension 49 of the bridge portion 47 indicated by dashed lines in FIG. 4. The annular portion 46 has an inner peripheral surface, an outer peripheral surface, and five void portions 50 in the form of round holes, particularly, of an elliptical shape that are formed through and along the annular portion 45. The void portions 50 extend from the inner peripheral surface to the outer peripheral surface. The void portions 50 are arranged in the annular portion 46 at portions corresponding to the bridge portions 47 of the annular portion 46 at intervals of one bridge portion 47. Each void portion 50 is formed in alignment with the extension 51 of the bridge portion 47. The first interphase insulating sheet 43 is configured such that the void portions 48 of the annular portion 45 and the void portions 50 of the annular portion 46 are arranged so as to be shifted from each other. This arrangement of the void portions 48, 50 corresponds to the phase shifting between the coil ends 39A, 39B, 39C, 39D, and 39E extending out from the lead wire side of the stator core 35 and the coil ends 39A, 39B, 39C, 39D, and 39E extending out from the side opposite to the lead wire side. The void portions 48, 50 of an elliptical shape have an arcuate inner wall, which prevents stress from being concentrated easily in the annular portions 45, 46.

Figure 5:
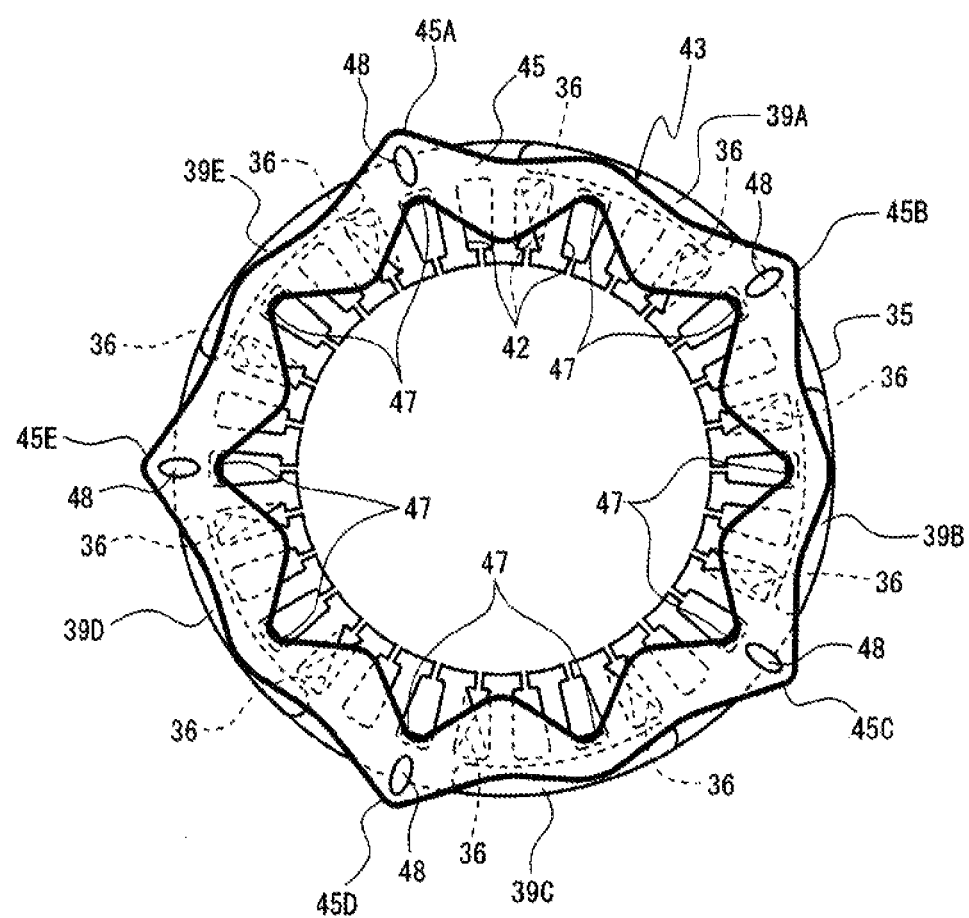
FIG. 5 is a front view illustrating relation between a U-phase coil and the first interphase insulating sheet.

How to mount the first interphase insulating sheet 43 to the stator core 35 will now be described. Referring to FIG. 5, the U-phase coil 36 is inserted in ten of the slots 42 at intervals of two slots 42 by wave winding. Accordingly, the coil ends 39A, 39B, 39C, 39D, and 39E are stretched at positions radially outward of the stator core 35 and the shape of the coil ends 39A, 39B, 39C, 39D, and 39E is adjusted. Subsequently, ten bridge portions 47 of the first interphase insulating sheet 43 are inserted to ten of the slots 42 for the V-phase coil 37 that are adjacent to the slots 42 in which the U-phase coil 36 is mounted (see FIG. 2). The annular portions 45, 46 of the first interphase insulating sheet 43 extend out from the opposite ends on the lead wire side and the side opposite to the lead wire side of the stator core 35, respectively (not shown).

The annular portion 45 that extends from the stator core 35 has portions that are in contact with the coil ends 39A, 39B, 39C, 39D, and 39E and portions 45A, 45B, 45C, 45D, and 45E that are located in an alternate manner with the coil ends 39A, 39B, 39C, 39D, and 39E. Each void portion 48 of the annular portion 45 is formed in alignment with the extension 49 of the bridge portions 47 arranged at the portions 45A, 45B, 45C, 45D, and 45E of the annular portion 45, respectively.

Therefore, the annular portion 45 tends to be bent radially outwardly at the positions of the void portions 48 by pressure of the coil ends 39A, 39B, 39C, 39D, and 39E acting radially inwardly of the stator core 35, resulting in extension of the portions 45A, 45B, 45C, 45D, and 45E radially outwardly of the stator core 35. This is also applicable to the annular portion 46 that is extending out from the side opposite to the lead wire side of the stator core 35 due to the void portions 50 formed in the annular portion 46. Therefore, the annular portions 45, 46 of the first interphase insulating sheet 43 are stretched to form a generally pentagon shape without being bent radially inwardly of the stator core 35.

Subsequently, the V-phase coil 37 is mounted to the stator core 35 by wave winding by inserting the V-phase coil 37 in the slots 42 in which the bridge portions 47 are inserted. The mounting of the V-phase coil 37 may be accomplished smoothly without being interfered with the first interphase insulating sheet 43 because the first interphase insulating sheet 43 is shaped generally into a pentagon. As shown in FIG. 2, the void portions 48 are formed at such positions that do not need insulation between the coil ends 39A, 39B, 39C, 39D, and 39E of the U-phase coil 36 and the coil ends 40A, 40B, 40C, 40D, and 40E of the V-phase coil 37 and, therefore, the insulating function of the first interphase insulating sheet 43 is not impaired. Furthermore, the void portions 48, 50 are formed in alignment with the extensions 49, 51 of the bridge portions 47, respectively, and therefore the strength of the annular portions 45, 46 is not lowered.

After the V-phase coil 37 has been inserted in the slots 42 by wave winding and the shapes of the coil ends 40A, 40B, 40C, 40D, and 40E have been adjusted, the bridge portions (not shown) of the second interphase insulating sheet 44 are inserted to ten of the slots 42 that are adjacent to the slots 42 through which the V-phase coil 37 is inserted. The second interphase insulating sheet 44 has substantially the same configuration as the first interphase insulating sheet 43 shown in FIGS. 3 and 4. In the second interphase insulating sheet 44, however, void portions 53 are formed through a pair of annular portions 52 (only the annular portion on the lead wire side thereof being shown in FIG. 2) extending out from the lead wire side and the side opposite to the lead wire side of the stator core 35, respectively. The void portions 53 are arranged between any two of the coil ends 40A, 40B, 40C, 40D, and 40E in the circumferential direction and in alignment with the extension of the bridge portions that connect the paired annular portions 52 of the second interphase insulating sheet 44 that overlaps with the annular portions 45, 46 of the first interphase insulating sheet 43.

Therefore, the annular portion 52 of the second interphase insulating sheet 44 is stretched substantially into a pentagon shape in the same manner as the first interphase insulting sheet 43. The insulation function and the strength of the second interphase insulating sheet 44 will not be lowered. Lastly, the W-phase coil 38 is inserted by wave winding in ten of the slots 42 in which the bridge portions of the second interphase insulating sheet 44 are inserted. Mounting of the three-phase coils to the stator core 35 is completed by stretching the coil ends 41A, 41B, 41C, 41D, and 41E of the W-phase coil 38 radially outwardly of the stator core 35 and then adjusting the shape of the coil ends 41A, 41B, 41C, 41D, and 41E.

According to the first embodiment, the first and second interphase insulating sheets 43, 44 having the void portions 48, 50, 53 formed at equidistantly in the circumferential direction of the insulating sheets 43, 44 may be bent naturally and neatly. Therefore, there is no fear that the first and second interphase insulating sheets 43, 44 extend out from the slots 42 of the stator core 35 and the shape of the first and second interphase insulating sheets 43, 44 is disordered. Furthermore, in the configuration in which each of the void portions 48, 50, 53 is formed in alignment with the extension of the bridge portions 47, any deterioration in the strength of the annular portions 45, 46, 52 which may result from the formation of the void portions 48, 50, 53 is prevented, damages to the annular portions 45, 46, 52 are prevented, and deterioration of the insulating function of the first and second interphase insulating sheets 43, 44 which may result from the damaged annular portions 45, 46, 52 is prevented.

According to the first embodiment wherein the void portions 48, 50, 53 are round holes with no corner, breakage of the annular portions 45, 46, 52 which may result from the formation of the void portions 48, 50, 53 is prevented. Furthermore, the void portions 48, 50, 53 are formed at such positions that do not need insulation, so that the insulating function between the coil ends 39, 40, 41 by the annular portions 45, 46 is not impaired. Furthermore, the rotating electric machine 3 of the electric compressor 1 for a vehicle according to the first embodiment is subjected to a large load due to vibration and the refrigerant gas passing through the rotating electric machine 3. However, because the void portions 48, 50, 53 of the first and second interphase insulating sheets 43, 44 are reinforced by the bridge portions 47 and therefore breakage or similar problems will not be caused to the first and second interphase insulating sheets 43, 44, which provides stable operation in the electric compressor 1. In the electric compressor 1, refrigerant gas flowing through the rotating electric machine 3 also passes through the void portions 48, 50, 53, which permits efficient dissipation of heat transferred from the U-phase coil 36, the V-phase coil 37 and the W-phase coil 38 to the first and second interphase insulating sheets 43, 44 through the refrigerant gas.

Second Embodiment

Figure 6:
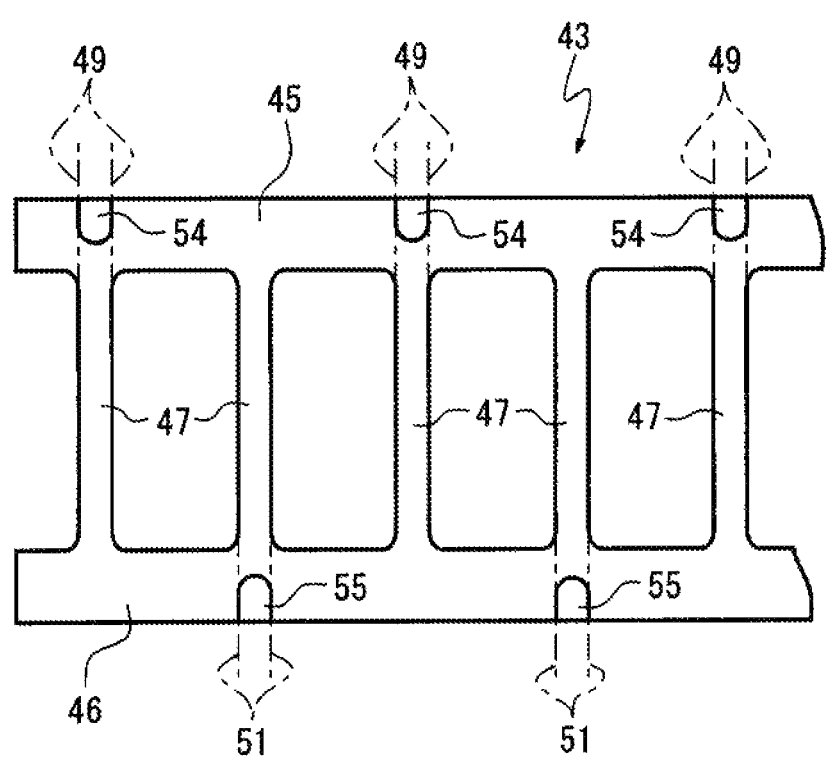
FIG. 6 is a fragmentary view showing a part of a first interphase insulating sheet according to a second embodiment of the present invention in a flattened state.

FIG. 6 is a fragmentary view showing a part of the first interphase insulating sheet according to the second embodiment of the present invention. In the drawing, those components of the interphase insulating sheet of the second embodiment that have the same configuration as those in the first embodiment will be designated by the same numerals and the detailed description thereof will be omitted. In the second embodiment, void portions 54, 55 are formed in the pair of annular portions 45, 46 of the first interphase insulating sheet 43.

The void portions 54 of the annular portion 45 are U-shaped indentations that are recessed from an end of the annular portion 45 that is on the side opposite to the side to which the bridge portions 47 are connected. The void portions 54 are arranged in the annular portion 45 at portions corresponding to the bridge portions 47 in the annular portion 45 and in alignment with the extension 49 of the bridge portions 47. The void portions 55 of the annular portion 46 are U-shaped indentations that are recessed from an end of the annular portion 46 that is on the side opposite to the side to which the bridge portions 47 are connected. The void portions 55 are arranged in the annular portion 46 at portions corresponding to the bridge portions 47 in the annular portion 46 and in alignment with the extension 51 of the bridge portions 47 that are arranged alternately with the bridge portions 47 in the annular portion 45 having the void portions 54. Although not shown in the drawing, the second interphase insulating sheet 44 of the second embodiment has void portions that have the same configuration as the void portions 54, 55. The inner wall of the void portions 54, 55 is formed into arcuate shape so that no stress concentration occurs in the annular portions 45, 46.

The void portions 54, 55 of the first and second interphase insulating sheets 43, 44 according to the second embodiment prevent the shape of the first and second interphase insulating sheets 43, 44 from being disordered and the insulating function and the strength of the first and second interphase insulating sheets 43, 44 from being impaired and, therefore, substantially the same effects as the first embodiment are obtained.

Third Embodiment

Figure 7:
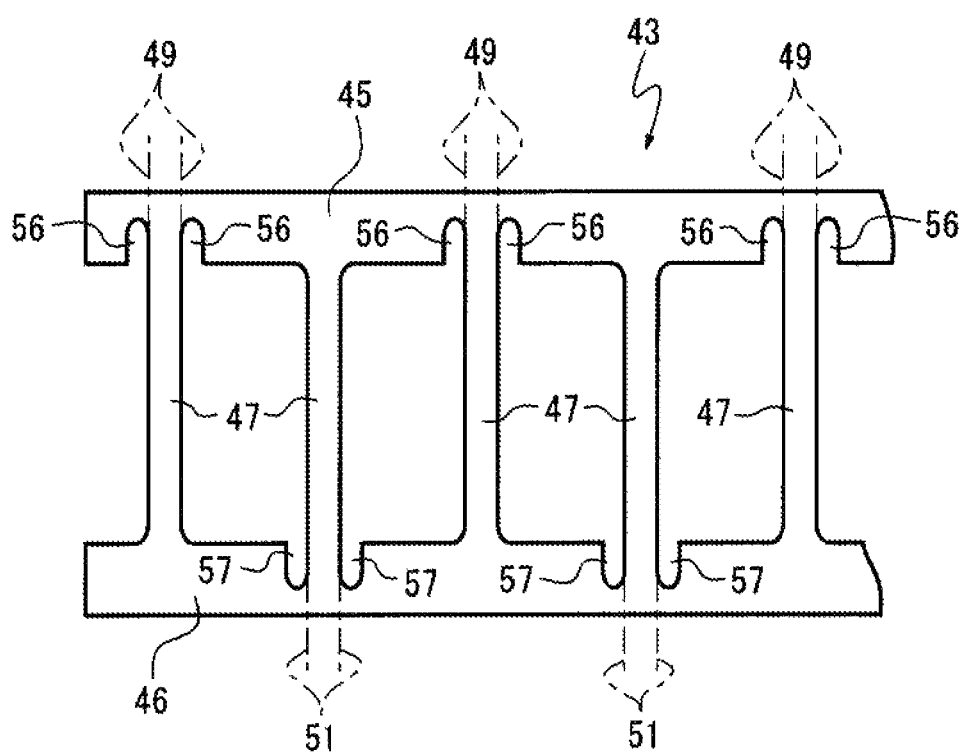
FIG. 7 is a fragmentary view showing a part of a first interphase insulating sheet according to a third embodiment of the present invention in a flattened state.

FIG. 7 is a fragmentary view showing a part of an interphase insulating sheet according to the third embodiment. Those components of the interphase insulating sheet of the third embodiment that have the same configuration as the counterparts of the first embodiment will be designated by the same numerals and the detailed description thereof will be omitted. In the third embodiment, void portions 56, 57 that are similar to the void portions 54, 55 in the second embodiment and opened on the inner side of the annular portions 45, 46 are formed in the pair of annular portions 45, 46 of the first interphase insulating sheet 43, respectively.

The void portions 56 of the annular portion 45 are U-shaped indentations that are recessed from an end of the annular portion 45 that is on the side to which the bridge portions 47 are connected in such a manner as to be opened toward the annular portion 46. The void portions 56 are arranged in pairs on opposite sides of the extension 49 of the bridge portions 47 in the annular portion 45 so that each void portion 56 is in alignment with the extension 49. The void portions 57 of the annular portion 46 are U-shaped indentations that are recessed from an end of the annular portion 46 that is on the side to which the bridge portions 47 are connected in such a manner as to be opened toward the annular portion 45. The void portions 57 are arranged in the annular portion 46 in pairs on opposite sides of the extension 51 of the bridge portions 47 which correspond to the void portions 56 in the annular portion 45. Each void portion 57 is formed in alignment with the extension 51 of the bridge 47. Although not shown in the drawing, the second interphase insulating sheet 44 of the third embodiment has void portions that have the same configuration as the void portions 56, 57 in the first interphase insulating sheet 43. The inner wall of the indentations, that is, the void portions 56, 57 are arcuate so that no stress concentration occurs in the annular portions 45, 46.

The void portions 56, 57 according to the third embodiment prevent the shape of the first and second interphase insulating sheets 43, 44 from being disordered and the insulating function and the strength of the first and second interphase insulating sheets 43, 44 from being impaired, so that the effects of the first embodiment are also obtained.

The present invention is not limited to the above-described embodiments, but it may variously be modified within the gist of the present invention as exemplified below.

(1) In the first to third embodiments, the second interphase insulating sheet 44 may not have the void portions 53.

(2) In the first embodiment, the shape of the void portions 48, 50 is not limited to an elliptical shape, but the hole may be of any shape including an oval, a round, and a square.

(3) In the first to third embodiments, it is preferable that the shape of the void portions should be holes or indentations such as 48, 50, 54, 55, 56 and 57, but such hole or indentation may be substituted with a linear slit.

(4) In the first to third embodiments, the void portions 48, 50, 53, 54, 55, 56 and 57 in each of the embodiments may be formed of any combination of various shapes.

(5) In the first to third embodiments, the first interphase insulating sheet 43 of the rotating electric machine 3 having the interphase insulating sheet according to the present invention is not limited to the three-phase AC electric motor having ten poles, but the rotating electric machine 3 may be a three-phase AC electric motor having less than 10 poles or a three-phase AC electric motor having more than 10 poles.

(6) The material for the first and second interphase insulating sheets 43, 44 is not limited to a synthetic resin, but it may be an insulating paper or any other insulative materials.

(7) Although the above-described first to third embodiments have been described in the context of the rotating electric machine 3 of the electric compressor 1 for a vehicle, the present invention is applicable to a rotating electric machine that is used for any other devices or mechanisms.

What is claimed is:

1. An interphase insulating sheet for a rotating electric machine, the rotating electric machine including an annular stator core, a first phase coil and a second phase coil different in phase from the first phase coil, the stator core including a plurality of slots in which the two phase coils are inserted by wave winding, each phase coil having a plurality of first coil ends extending out from a first axial end of the stator core and a plurality of second coil ends extending out from a second axial end of the stator core, the interphase insulating sheet comprising:
    a first annular portion for providing insulation between the first coil ends of the two phase coils;
    a second annular portion for providing insulation between the second coil ends of the two phase coils; and
    a plurality of bridge portions connecting the first annular portion to the second annular portion, the bridge portions being configured to be mounted to the slots, wherein
    at least one of the annular portions has a plurality of void portions extending from an inner peripheral surface to an outer peripheral surface of the annular portion,
    the void portions are arranged equidistantly in a circumferential direction,
    the void portions are arranged at portions corresponding to the bridge portions,
    the first phase coil arranged radially outward of the second phase coil,
    the void portions are arranged between at least one of the first and second coil ends of the first phase coil,
    each annular portion has a plurality of regions that connect adjacent bridge portions in a circumferential direction thereof,
    each of the bridge portions including a pair of extensions, provided between any two adjacent regions, and which are part of the first annular portion and the second annular portion, and
    the void portions being located in at least one of the extensions of each of the bridge portions.

2. The interphase insulating sheet for the rotating electric machine according to claim 1, wherein the void portions are round holes.

3. The interphase insulating sheet for the rotating electric machine according to claim 1, wherein the void portions are U-shaped indentations recessed from one axial end of each annular portion.

4. The rotating electric machine according to claim 1 further comprising a third phase coil different in phase from the first phase coil and the second phase coil, wherein
    the third phase coil is arranged radially inward of the second phase coil,
    the interphase insulating sheet includes a first interphase insulating sheet disposed between the first phase coil and the second phase coil and a second interphase insulating sheet disposed between the second phase coil and the third phase coil,
    the void portions of the first interphase insulating sheet are arranged between at least one of the first and second coil ends of the first phase coil, and
    the void portions of the second interphase insulating sheet are arranged between the coil ends of the second phase coil and overlap with one of the first and second annular portions of the first interphase insulating sheet.

5. An electric compressor for a vehicle comprising the rotating electric machine according claim 1.

6. The interphase insulating sheet for the rotating electric machine according to claim 1, wherein the void portions are provided only on at least one of the annular portions.

7. The interphase insulating sheet for the rotating electric machine according to claim 1, wherein the void portions are not provided on any of the bridge portions.

\* \* \* \* \*